United States Patent [19]

Leflar et al.

[11] Patent Number: 4,498,265

[45] Date of Patent: Feb. 12, 1985

[54] SOLAR COLLECTOR CONSTRUCTION AND SEALING ARRANGEMENT

[75] Inventors: James A. Leflar; William C. Wardlow, both of Fort Collins, Colo.

[73] Assignee: International Solarpanel, Inc., Fort Collins, Colo.

[21] Appl. No.: 387,358

[22] Filed: Jun. 11, 1982

[51] Int. Cl.$^3$ .............................................. E06B 3/26
[52] U.S. Cl. .................................... 52/403; 126/450; 52/716
[58] Field of Search ........... 126/450; 220/81 R, 82 R; 52/308, 402, 403, 482, 716, 400, 397, 309.1, 465

[56] References Cited

U.S. PATENT DOCUMENTS

| 2,497,957 | 4/1946 | Pelley | 52/397 |
| 3,040,389 | 6/1962 | Fengler | 52/403 |
| 3,766,698 | 10/1973 | Dallen | 52/403 |
| 4,207,868 | 6/1980 | Peterson | 126/450 |
| 4,358,917 | 11/1982 | Oda et al. | 52/400 |

FOREIGN PATENT DOCUMENTS

| 274389 | 9/1964 | Netherlands | 52/397 |
| 478327 | 10/1969 | Switzerland | 52/400 |

Primary Examiner—James C. Yeung
Assistant Examiner—Noah Kamen
Attorney, Agent, or Firm—Thorpe, North & Western

[57] ABSTRACT

A sealing arrangement is disclosed by which a glass panel cover may be installed with a weather-tight seal in a solar collector housing. The housing includes side walls, the upper edges of which are formed with a generally cylindrical groove which faces upwardly. The sealing arrangement includes an elongate resilient body formed with a generally cylindrical anchor section having a cross-section of a dimension just the same as or less than the cross-section dimension of the cylindrical groove, and a holding section formed integrally with the anchor section near the top thereof and having a generally U-shaped cross-section which faces inwardly of the housing.

7 Claims, 2 Drawing Figures

SOLAR COLLECTOR CONSTRUCTION AND SEALING ARRANGEMENT

BACKGROUND OF THE INVENTION

This invention relates to a solar collector and more particularly to a system for sealing a glass panel or the like to the sides of a solar collector case or housing.

Solar collectors may take a variety of configurations, but a typical collector will include a case or housing in which is positioned a heat collecting or absorbing plate, conduits placed in contact with the plate for carrying a heat transfer fluid, and headers for distributing fluid to the conduits and receiving fluid therefrom. The top side of the housing is covered by one or more glass panels for allowing sunlight to pass therethrough onto the heat absorbing plate. It is desired that such a glass panel be effectively sealed in the housing so that the panel can serve both to prevent the entry of moisture and to retain within the housing air which is heated by the sunlight. Additionally, it is desired that such glass panels be readily removable to allow access to the interior of the housing.

Caulking has been used in the past to obtain a weather-tight seal between the glass panel and side walls of a solar collector housing, but such a seal is difficult and time-consuming to install and, when the glass panel is removed, the seal is destroyed and must be reinstalled when the panel is put back in place. Gaskets of various types have also been used to seal glass panels in collector housings, with some type of metal cap strip being used to apply pressure to the gaskets. The cap strips are generally held in place by spaced apart screws or bolts, and such spacing typically results in the sealing pressure being uneven around the perimeter of the housing ("scalloping" of the seal). A number of arrangements have been proposed which would not use screws or bolts to seal glass panels in collector housings, but these arrangements are oftentimes complicated in design, require a multiplicity of separate elements, and are expensive to manufacture. Exemplary prior art solar collectors and sealing arrangements are disclosed in U.S. Pat. Nos. 4,206,748, 4,269,173, 4,231,204 and 4,266,383.

SUMMARY OF THE INVENTION

It is an object of the invention to provide a simple and easy to construct sealing arrangement for sealing the edge of a glass panel or the like to the sides of a case or housing.

It is another object of the invention to provide such a sealing arrangement which may be readily installed in and removed from a housing without damage to the sealing arrangement elements.

It is a further object of the invention to provide such a sealing arrangement which, without the use of additional fastening elements, develops a substantially continuous and uniform pressure and seal about the perimeter of the glass panel installed in the housing to prevent leaking.

The above and other objects of the invention are realized in a specific illustrative embodiment of a sealing arrangement for sealing the edge of a glass panel or the like to the sides of a housing. The sides of the housing are formed with a generally upward facing cylindrical groove whose opening is narrower than the widest part of the groove. Also included is an elongate resilient body which is formed with an anchor section having a generally cylindrical cross-section dimensioned to fit snuggly within the groove, and a holding section integrally formed with the anchor section near the top thereof and having a generally U-shaped cross-section which faces laterally of the anchor section for receiving the edge of the glass panel.

In accordance with one aspect of the invention, the anchor section is formed to have a generally annular cross-section with a slit at the top thereof, and a generally cylindrical central opening which is wider than the slit. The resilient body further incudes an upwardly projecting neck which is formed integrally with the anchor section near the top thereof and is separated from the holding section by the slit. An elongate lock strip is provided for fitting over the resilient body when the body is placed in the groove of the housing side walls. The lock strip includes an elongate cap section which fits over the holding section and neck of the resilient body, and a downwardly extending projection enlarged at the lower end thereof to fit within the slit and central opening of the anchor section to hold the lock strip in place.

The dimensions of the housing side wall, resilient body, and lock strip are selected so that when installed, the resilient body is compressed to develop a weather-tight seal between the edge of the glass panel and the housing.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
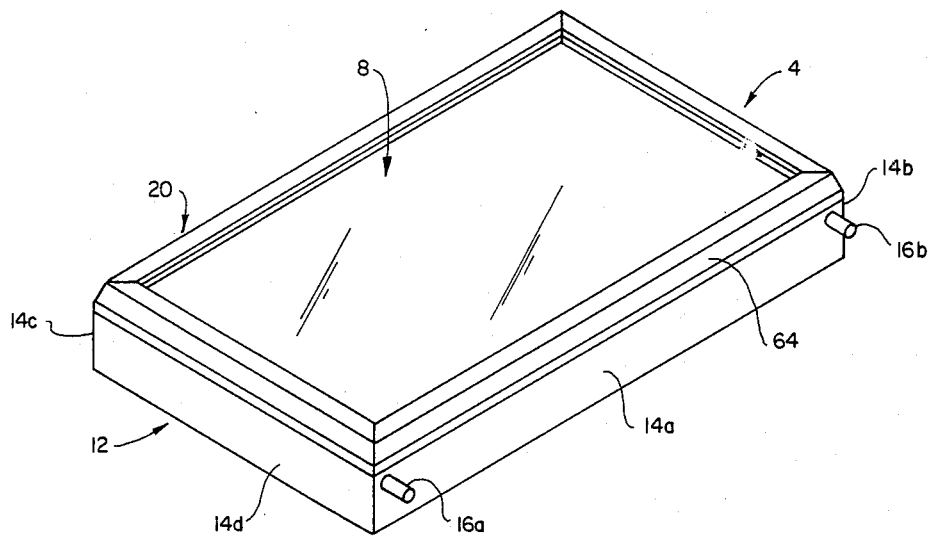
FIG. 1 is a perspective view of a solar collector made in accordance with the principles of the present invention.

Referring to FIG. 1, there is shown a solar collector 4 of conventional design except for the arrangement by which a glass panel cover 8 is sealingly secured in the solar collector case or housing 12. Although not shown in FIG. 1, the housing 12, which may take a variety of shapes but is generally rectangular as shown, contains a heat absorbing plate, a plurality of heat transfer fluid carrying conduits disposed in thermal contact with the plate, and manifolds or headers for supplying the fluid to the conduits and receiving the fluid therefrom. The fluid is supplied to the headers and received therefrom by way of conduits 16a and 16b which extend through side walls 14a and 14c of the housing 12. A bottom wall and appropriate insulation are also provided in the housing 12 in a conventional fashion. The glass panel 8 is secured in the housing 12 by way of sealing system 20 which is shown in a perspective sectional view in FIG. 2.

Figure 2:
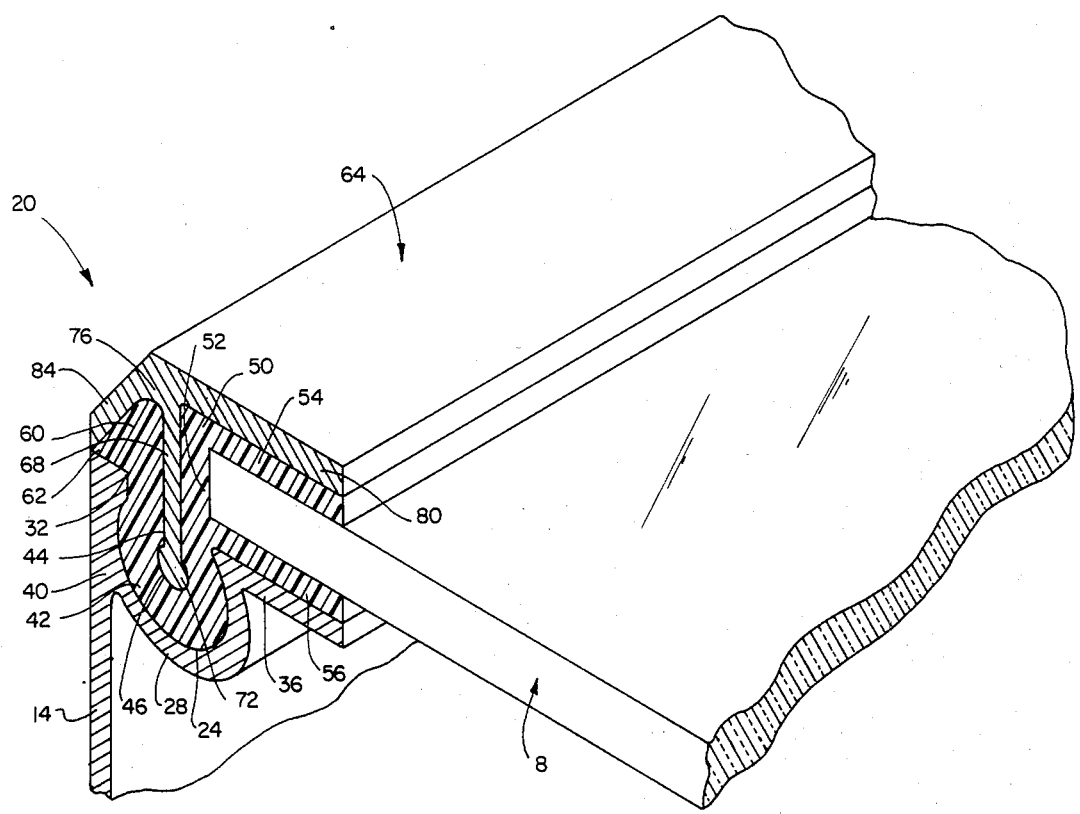
FIG. 2 is a perspective sectional view of the sealing arrangement of the present invention.

As shown in FIG. 2, the side walls 14 of the housing 12 of FIG. 1 are formed at their upper edges to define an upwardly facing groove 24 whose cross-section is generally cylindrical. The groove 24 is defined by a groove wall 28 which extends from a locus below the top edge 32 of the side wall 14 inwardly and then upwardly where it terminates at an elevation just below that of the top edge 32 of the wall 14. A lip 36 projects inwardly of the wall 14 from the top of the groove wall 28. The width of the opening of the groove 24 is less than the diameter thereof to facilitate securing a sealing member in the groove. The groove 24 is formed at the upper edge of the side walls of the housing 12 around the entire periphery of the housing to receive a sealing member as will next be described.

FIG. 2 is a perspective sectional view of the sealing system 20 of the present invention. This system includes an elongate resilient sealing member 40 which comprises a lower anchor section 42 having a generally annular cross-section with a slit 44 located at the top thereof and with a generally cylindrical opening or channel 46 positioned centrally in the anchor section. The anchor section 42 has an exterior diameter just the same as or greater than the diameter of the groove 24 so that when the anchor section is placed in the groove, it is compressed uniformly along its length. Also, the diameter of the anchor section 42 is greater than the width of the groove opening so that once the anchor section is placed in the groove, it tends to be retained therein.

The sealing member 40 also includes a holding section 50 formed integrally with the anchor section 42 near the top thereof and having a generally U-shaped cross-section which faces inwardly of the side wall 14 for receiving the edge of the glass panel 8 as shown. The holding section includes a side wall 52 which projects upwardly from the top of the anchor section on one side of the slit 44. Also included are a top wall 54 and a bottom wall 56 vertically spaced apart and integrally formed with and projecting laterally from the side wall 52.

A neck 60 is also formed integrally with the anchor section 42 near the top thereof to project upwardly in parallel with the side wall 52 and separated from the side wall by the slit 44. As may be noted from FIG. 2, the thicknesses of the anchor section 42, side wall 52, top and bottom walls 54 and 56, and lip 60 are about the same. A laterally projecting lip 62 in the shape of an eave is formed on the neck 60 to extend over a part of the upper edge of the side wall 14.

An elongate lock strip for "locking" the sealing member 40 in place in the groove 24 and for uniformly compressing the sealing member along its length to produce the desired weather-tight seal is shown at 64. The lock strip 64 includes a downwardly extending projection or leg 68 which, in turn, includes an enlargement 72 at the lower end thereof. The enlargement 72 is generally cylindrical in cross-section to fit in the central opening 46 of the anchor section 42. The lock strip 64 also includes a cap section 76 integrally formed with the projection 68. The cap section includes an inwardly extending flange 80 which is disposed to fit over the top wall 54 of the sealing member 40, and a collar 84 which extends laterally in the opposite direction of the flange and downwardly to fit over the neck 60 of the sealing member.

The dimensions of the groove 24, sealing member 40, and lock strip 64 are selected so that the sealing member 40 is substantially uniformly compressed along its length to provide the desired seal between the glass panel 8 and the side wall 14 of the housing. In particular, the diameter of the enlargement 72 is the same or just greater than that of the central opening 46, the width of the neck 60 is the same or just greater than the spacing between the projection 68 and the collar 84, and the thicknesses of the top and bottom walls 54 and 56 are the same or just greater than the separation between the flange 80 and the glass panel 8, and between the glass panel 8 and the lip 36 respectively. With this configuration, the sealing member 40 is uniformly compressed along its length and held in place in the groove 24 by the lock strip 64. No caulking, screws or bolts, or other fastening devices are required to maintain the sealing member 40 in place. Because no fastening devices are required, the potential for leaking is reduced and the width of the lock strip 64 can be less to allow an increase in the surface area exposure of the solar collector.

Advantageously, the sealing member 40 is made of ethylene propylene diene monomer (E.P.D.M. rubber). The lock strip 64 may be constructed of extruded aluminum.

The sealing system is installed by first inserting the glass panel 8 between the top and bottom walls 54 and 56 of the sealing member 40. The sealing member 40, with the glass panel 8, is then placed onto the housing 12 so that the anchor section 42 is disposed in the groove 24. Finally, the lock strip 64 is forced into place on the sealing member 40 to secure the entire assembly together. The corners of the lock strip 64 need not be joined together because the resilient member 40 is one-piece and forms a uniform and continuous weather-tight seal about the entire perimeter of the housing 12.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A sealing arrangement for sealing the edge of a glass panel or the like to the sides of a case where the sides of the case are formed with a generally cylindrical groove which faces upwardly and whose opening is narrower than the widest part of the groove, said sealing arrangement including an elongate resilient body comprising
    an anchor section dimensioned to fit snuggly within the groove and having an annular cross-section with a slit at the top thereof and a generally cylindrical central opening which is wider than the slit,
    a holding section formed integrally with the anchor section near the top thereof and having a side wall projecting upwardly from the top of the anchor section, and a pair of vertically spaced holding walls integrally formed with and projecting laterally from the side wall for receiving the edge of a glass panel or the like,
    an upwardly projecting neck which is formed integrally with the anchor section near the top thereof and is separated from said side wall by said slit, and
    wherein said sealing arrangement further includes an elongate lock strip which fits over said resilient body and includes
        an elongate cap section which fits over the uppermost holding wall and the neck, and
        a downwardly extending projection enlarged at the lower end thereof to fit within the slit and central opening of the anchor section.

2. A sealing arrangement as in claim 1 wherein said cap section of the lock strip includes a laterally extending flange which fits over and conforms to the shape of the uppermost holding wall, and a collar which extends laterally in the opposite direction of said flange and downwardly to fit over and conform to the shape of said neck, the bottom edge of said collar being disposed contiguous with the outer edge of the groove formed in the side of the case.

3. A sealing arrangement as in claim 2 wherein the side wall, holding walls, walls of the anchor section, and neck of the resilient body are generally of uniform thickness.

4. A sealing arrangement as in claim 2 wherein said resilient body is comprised of ethylene propylene diene monomer.

5. A sealing arrangement as in claim 2 wherein the groove formed in the side of the case, anchor section of the resilient body, and downwardly extending projection of the lock strip are dimensioned so that the anchor section is compressed when positioned in the goove and when the projection is placed in the slit and central opening of the anchor section.

6. A sealing arrangement as in claim 1 wherein said neck includes a laterally projecting lip which overhangs a part of the upper edge of the side of the case.

7. A solar collector comprising
a housing having side walls, the upper edges of which are formed with a generally cylindrical groove which faces upwardly,
an elongate resilient body formed with an anchor section having a generally cylindrical cross-section of a dimension just less than the cross-section dimension of the cylindrical groove, and a holding section formed integrally with the anchor section near the top thereof and having a generally U-shaped cross-section which faces inwardly of the housing, said anchor section being fitted in the groove of the housing side walls, said anchor section being formed to have a generally annular cross-section with the slit at the top thereof and a generally cylindrical central opening which is wider than the slit, said resilient body further including an upwardly projecting neck integrally formed with the anchor section near the top thereof, said neck being separated from the holding section by said slit,
a glass panel whose peripheral edges are fitted into the holding section of the resilient body, and
an elongate lock strip which includes an elongate cap section which fits over and generally covers the resilient body and an elongate projection which extends downwardly from and is formed integrally with the cap section, said projection being enlarged at the lower end thereof to fit within the central opening of the anchor section to hold the lock strip in place over the resilient body and secure the resilient body in place in the groove.

* * * * *